J. R. ROWELL.
Lens for Spectacles.

No. 210,712.                     Patented Dec. 10, 1878.

WITNESSES.                                INVENTOR.

UNITED STATES PATENT OFFICE.

JONATHAN R. ROWELL, OF HILL, NEW HAMPSHIRE.

IMPROVEMENT IN LENSES FOR SPECTACLES.

Specification forming part of Letters Patent No. 210,712, dated December 10, 1878; application filed June 24, 1878.

*To all whom it may concern:*

Be it known that I, JONATHAN R. ROWELL, of Hill, county of Merrimack, and State of New Hampshire, have invented a new and useful Improvement in Lenses for Spectacles, which improvement is fully set forth in the following specification.

This invention relates to certain improvements in lenses for spectacles or hand-glasses; and consists in providing a circular lens, which may be either plano-convex or concavo-convex, with a polished beveled edge at its outer surface, in addition to the usual beveled securing-surface, said beveled or polished edge forming an annular ring around the lens, and having either a plain or convex surface, and inclined to the axis of the lens, so as to form a focus of the rays passing through it within the focus of the rays passing through the center of the lens, so that the rays diverging from the first focus will spread over and illuminate the dark circle surrounding the focus made by the center of the lens.

Figure 1:
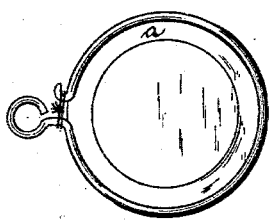
Figure 2:
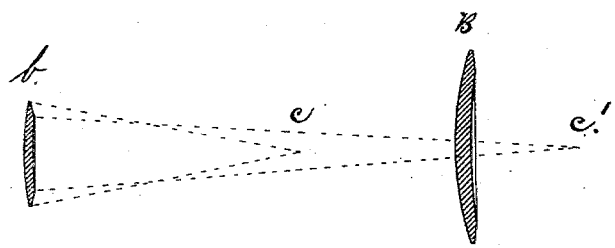

The form of the lens which I employ is shown in the drawing accompanying this specification, in which Figure 1 is a plan of the lens, showing the beveled ring at *a*. In Fig. 2, B is a cross-section of the same, and at *b* the same is shown reduced in size. The dotted lines show the rays passing through the ring, which meet or come to a focus at *c*, while those passing through the center of the glass come to a focus at *c'*.

The annular ring is shown with a straight beveled surface. A convex surface may be used; or a ring may be composed of two or more angles, each angle set at a different inclination to the axis, and each producing its own focus of light.

A good illustration of the operation of my lens is shown by holding it close to any dark surface, and allowing the rays of the sunlight to pass through it, when a bright circle of light will be shown. As the lens is moved farther away from the surface the ring of light will contract until it comes to a focus, and will then spread again from the divergence or crossing of the rays until, when the focus of the rays passing through the center of the glass is reached, the rays from the ring will have spread over and lighted up the dark ground surrounding the inner focus.

When used as a glass for spectacles, it has the effect of producing an apparently-enlarged area at the point at which the object is seen, so that a pair of spectacles with these lenses will be found to be adapted to eyes of different requirements, and that they will be less trying to weak eyes, and will consequently require less frequent changing than with the glasses as heretofore constructed.

The rays of light passing through the center of the lens meet, or come to a focus, at, say, sixteen inches from the glass. Now, the space around the focal point is made dark by the concentration of rays to the center. The object of the surrounding ring is, that it shall direct its rays so as to overspread the dark surface, making it lighter. This it does by being so arranged that its focus shall come within the other, and the rays spreading beyond the focus cover the dark surface surrounding the center of light. The addition of light at the focal point renders objects placed therein more clearly visible, and has the effect of producing an apparently-enlarged area of light.

Having thus described the nature and operation of my invention, what I claim as new, and desire to secure by Letters Patent, is—

A spectacle-lens having an annular beveled and polished edge in addition to the usual beveled securing-edge, and so arranged as to produce two separate focuses, in the manner shown, and for the purpose specified.

JONATHAN R. ROWELL.

Witnesses:
SMITH D. FELLOWS,
ALBERT S. LYON.